United States Patent
Lee (12) United States Patent (10) Patent No.: US 6,618,721 B1
(45) Date of Patent: Sep. 9, 2003

(54) METHOD AND MECHANISM FOR DATA SCREENING

(75) Inventor: Edmund G. Lee, Palo Alto, CA (US)

(73) Assignee: Pharsight Corporation, Mountain View, CA (US)

( * ) Notice: Subject to any disclaimer, the term of this patent is extended or adjusted under 35 U.S.C. 154(b) by 0 days.

(21) Appl. No.: 09/676,358

(22) Filed: Sep. 29, 2000

Related U.S. Application Data (63) Continuation-in-part of application No. 09/565,873, filed on May 5, 2000, and a continuation-in-part of application No. 09/557,520, filed on Apr. 25, 2000.

(51) Int. Cl.[7] .............................................. G06F 17/30
(52) U.S. Cl. ................................................ 707/3; 707/9
(58) Field of Search ........................................ 707/3, 9

(56) References Cited

U.S. PATENT DOCUMENTS

| | | | |
|---|---|---|---|
| 5,324,077 A | 6/1994 | Kessler et al. ................ 284/54 |
| 5,566,069 A | 10/1996 | Clark, Jr. et al. ........... 364/420 |
| 5,614,927 A | * 3/1997 | Gifford et al. .............. 707/531 |
| 5,655,540 A | * 8/1997 | Seegobin .................... 600/515 |
| 5,784,460 A | 7/1998 | Blumenthal et al. ........... 380/4 |
| 5,862,325 A | 1/1999 | Reed et al. ............. 395/200.31 |
| 5,913,028 A | 6/1999 | Wang et al. ............ 395/200.33 |
| 5,951,300 A | 9/1999 | Brown ........................ 434/236 |
| 5,958,052 A | * 9/1999 | Bellovin et al. ............ 709/225 |
| 6,092,197 A | * 7/2000 | Coueignoux ................ 709/201 |
| 6,119,098 A | * 9/2000 | Guyot et al. ................. 705/10 |
| 6,327,574 B1 | * 12/2001 | Kramer et al. ................ 705/10 |

* cited by examiner

*Primary Examiner*—Safet Metjahic
*Assistant Examiner*—Haythim J. Alaubaidi
(74) *Attorney, Agent, or Firm*—Townsend and Townsend and Crew LLP (57) ABSTRACT

The present invention is directed to a method and mechanism to selectively evaluate data items and search queries for privacy violations. According to an embodiment of the invention, attributes of a data item are identified and quantified to evaluate its potential to violate privacy interests. Search queries can be evaluated before accessing the records according to an embodiment, which improves operating efficiency and provides additional privacy protections. The query evaluation determines whether to disallow a query or withhold a query result if an individual or a small group of individuals can be identified by the results or if variables revealed will violate privacy policies. Also, the invention enables a provider of information to systematically evaluated the selectivity and visibility of attributes that are analyzed to allow or disallow queries and to set thresholds for different combinations of attributes. This allows implementation of different privacy policies, which may vary based on the database, the attributes, and/or the source of the query.

13 Claims, 4 Drawing Sheets

METHOD AND MECHANISM FOR DATA SCREENING

CROSS REFERENCE TO RELATED APPLICATIONS

This application is a continuation-in-part of U.S. application Ser. Nos. 09/557,520, filed Apr. 25, 2000, and 09/565,873, filed May 5, 2000.

BACKGROUND OF THE INVENTION

Research projects in many fields often require access to confidential information to successfully fulfill stated research objectives. For example, medical researchers may need detailed information about demographics, treatments, disease progression, outcomes, and side-effects in a diverse patient population to plan scientifically valid tests of new treatments. At the same time, ethical and legal requirements to protect privacy rights are important conditions for enabling access to confidential data, particularly in the medical field with respect to patient information. An individual's employment, access to housing, or insurability might be adversely affected by disclosure of private health-care records. Unfettered access to confidential information may result in the unintentional disclosure of information in a manner that would violate the privacy interests of the data subjects that contributed the information. Therefore, techniques are needed to protect the privacy or confidentiality of data subjects, while still allowing sufficient access to confidential information to enable socially desirable research objectives.

One such technique is the elimination or modification of data fields in a database that would observably identify a specific individual, such as a name field, full address field, or social security number field. This method has limited utility since it only addresses individual data fields, whereas in some instances, combinations of data fields could lead to a violation of a data subject's privacy. Consider a database query that searches a patient database for a specific combination of a birth date, zip code, and disease status. This combination of information may be enough to indirectly identify specific individuals, even if information that directly contains the identity of a unique data subject is obscured. For example, if the chosen zip code for this database query is a zip code that only applies to the White House in Washington, DC, then the results of this query would almost certainly allow identification of a specific data subject due to the limited number of individuals in that zip code. If the disease status of that data subject is highly confidential, then allowing this type of query could violate the data subject's privacy rights.

However, excluding any data in the database that might, in combination with other data, lead to a privacy or confidentiality disclosure would render many databases useless. Date of birth may be important for studying time-related effects of diseases and zip code important for studying geographic distributions of diseases. Simply disallowing any access to such data is often too inflexible to accomplish many research goals.

Another approach is to group related data subjects into cells, such as grouping data subjects by race, age group, and zip code, and disallowing access to any cell that that has a "small" number of subjects. This method is inflexible in that it does not consider the specific query that may reference the cell, which means that some queries may be needlessly disallowed. Known methods also fail to provide systematic methods for identifying relevant cells, usually assuming that demographic variables are the principal or only attributes of concern.

Yet another approach is to provide access only to summaries of confidential information while withholding the detailed information used to compile those summaries. However, certain types of research questions can only be answered with access to the detailed data and simply disallowing this access would frustrate a researcher's ability to accomplish research goals.

Another approach is an "ad hoc" method of determining whether certain types of information should be withheld from a researcher. This method relies upon the judgement of a person responsible for managing the confidential information to decide upon the available scope of use or disclosure for that information. Many drawbacks exist with this ad hoc method, including lack of a systematic and consistent approach to classifying data, inability to consider the classification of data in light of specific database queries, and total reliance upon the judgement of persons designated with responsibility to classify the information—who may or may not be qualified or adequately trained.

Therefore, it is advantageous to implement a system and method to intelligently and systematically classify data items and/or data queries based upon their potential to violate privacy or confidentiality terms under which the data was originally assembled. Such a system is applicable to fields other than just the health-care example discussed above, including but not limited to, census data, financial records, motor vehicle information, and national security data.

SUMMARY OF THE INVENTION

In view of the above, the present invention is advantageous in that it provides a method to selectively evaluate data items and search queries for privacy violations. According to an embodiment of the invention, attributes of a data item are identified and quantified to evaluate their potential to violate privacy interests. Search queries can be evaluated before accessing the records according to an embodiment, which improves operating efficiency and provides additional privacy protections. The query evaluation determines whether to disallow a query or withhold a query result if an individual or a small group of individuals can be identified by the results or if variables revealed will violate privacy policies. Also, the invention enables a provider of information to systematically evaluated the selectivity and visibility of attributes that are analyzed to allow or disallow queries and to set thresholds for different combinations of attributes. This allows implementation of different privacy policies, which may vary based on the database, the attributes, and/or the source of the query.

Further aspects, objects, and advantages of the invention are described below in the detailed description, drawings, and claims.

BRIEF DESCRIPTION OF THE DRAWINGS

The invention, together with further advantages thereof, may best be understood by reference to the following description taken in conjunction with the accompanying drawings in which.

DETAILED DESCRIPTION

The present invention is directed to a method and mechanism for privacy screening of data to protect the privacy interests of data subjects corresponding to that data. As used herein, a data subject refers to a person, entity or object which is associated with a set of data items. For a patient database, a data subject would be an individual patient that is tracked in that database and categories of data items could include name, address, social security number, disease status, etc. Note, however, that the present invention is applicable to any type of data subject, beyond just human patients, and could refer any information source having privacy requirements for its information, such as a corporation, country or other identifiable entity or object.

The present invention provides a mechanism for evaluating data items based upon attributes indicative of the likelihood of identification of a corresponding data subject if access is given to those data items. According to an embodiment, at least two independent attributes are utilized to evaluate data items. A first attribute relates to a measure of how small set of individuals is determined by a data item. A second attribute relates to the "secrecy" or privacy property of the data item. These attributes can be assigned quantifiable values to permit systematic categorization of data items.

According to an embodiment of the invention, a first attribute that can be used to evaluate data items is the "selectivity" of a data item. The term selectivity as used herein relates to a measure of how small a set of individuals is determined by a particular piece of information in a given population. "Social Security number" is highly selective since there should be only a single individual having a certain social security number. "People with brown eyes" is not very selective since the set of individuals having this quality in a given population (e.g., in the United States) is very large.

According to the preferred embodiment, selectivity is determined by an omniscient observer having perfect knowledge. Thus, selectivity is independent of the relative difficulty or expense in discovering a particular item of information. For example, "genotype" is highly selective since a specific genotype almost certainly corresponds to an individual data subject, but this item of information is relatively expensive, technically difficult, and time-consuming to obtain. On the other hand, "Social Security Number" is also highly selective, but is relatively easy to obtain.

The selectivity of a data item can be quantified in various ways. A first illustrative approach is to classify data items into broad categories of selectivity such as "low", "moderately low", "medium", "moderately high", and "high" selectivity. A second illustrative approach is to quantify selectivity along a scale of values, e.g., from 1 to 10.

Selectivity can be quantified based upon either the proportion of a given population corresponding to a data item or upon the absolute/approximate number of data subjects corresponding to a particular data item. According to the proportion approach, selectivity is quantified using the precise or approximate fraction of data subjects in a particular population corresponding to a data item. Consider the data item "People with black hair". If the population to consider is the United States, the number of individuals having black hair in the United States is 120 million, and the total population is 300 million, then selectivity of this data item is (120 million/300 million) or (0.4). Under this approach, higher selectivity corresponds to a smaller number and lower selectivity corresponds to a higher number. "Social Security Number", which normally corresponds to only a single data subject in the United States, has a selectivity of (1/300 million) or (3.3333333333e-9). According to the absolute/approximate number of data subjects approach, selectivity is quantified based upon the number of data subjects, either absolute or approximate, that correspond to a data item—without regard to the percentage or fraction of these data subjects in the population. For example, a set having only a single data subject (e.g., "Social Security Number") could be considered to have "very high selectivity" regardless of the percentage of this set within the overall population. As another example, a set having 2 to 50 data subjects (e.g., "home telephone number") could be considered to have "high selectivity" and a set having over 100,000 data subjects (e.g., "people with black hair") could be considered to have "very low selectivity", etc. This absolute/approximate numbers approach must be considered with respect to the total number of data subjects in the population and is more advantageously employed when the population to consider has a sufficiently large number of data subjects.

The importance of the selectivity attribute is that data items corresponding to higher selectivity can be used to more easily identify a specific data subject than data items corresponding to lower selectivity. Therefore, a data item having high selectivity generally creates a greater danger to privacy interests than a data item having low selectivity.

A second attribute that can be used to evaluate data items is the "prior visibility" of a data item. Prior visibility relates to the amount of certainty or visibility that an observer has about a data item for a given individual prior to accessing a database of confidential information. For example, "Blue eyes" is a data item that an observer can easily determine for a data subject and is therefore considered highly visible (i.e., high prior visibility). Other common demographics such as residence address and telephone number are essentially public information and therefore are highly visible. Information that is not generally known or available to an ordinary observer, such as "had or didn't have a Prozac prescription", is considered to have low prior visibility.

Determinations of prior visibility depend upon the data subject, the observer, and the data item in question. For special observers, such as a primary care physician or spouse, some data items for a data subject are highly discernible—but those same data items may be poorly discernible for ordinary observers. According to an embodiment of the invention, prior visibility is based upon the ordinary observer without specialized knowledge or access to a data subject. Alternatively, different prior visibility ratings can be established based upon different classes of observers or intended researchers.

Like selectivity, prior visibility can be quantified in various ways. A first illustrative approach is to classify data items into broad categories of prior visibility such as "low", "medium", or "high". A second illustrative approach is to quantify prior visibility along a scale of values, e.g., from 1 to 10.

Table 1 presents some example selectivity and prior visibility values for various data items:

TABLE 1

| Data Item | Selectivity | Prior visibility | Notes on selectivity | Notes on prior visibility |
|---|---|---|---|---|
| Social security number | High | High | Unique identifier. | Can pay to get information. |
| Zip code | High | High | A few thousand people | Easy to find out |
| DNA sequence (genotype) | High | Low | Unique identifier. | Extremely low. Only a few people have been completely sequenced. |

TABLE 1-continued

| Data Item | Selectivity | Prior visibility | Notes on selectivity | Notes on prior visibility |
|---|---|---|---|---|
| Positive HIV status | High | Low | Rare in the U.S. population (although high in sub-populations) | Low. Most people do not publicly disclose this. |
| Myocardial infarction diagnosis on Jan. 1, 1997 | Moderately high | High | Only a few had a myocardial infarction on that date. | Usually not secret. |
| Death in 1997 | Moderately high | High | A few percent of the population died in 1997. | Easy to find out whether someone died in 1997. |
| Selective seratonin reuptake inhibitor prescription on Jan. 1, 1997 | Moderately high | Low | Only a few individuals had this prescription on that date. | Most people don't routinely disclose their SSRI prescription status. |
| Sex | Low | High | Selects about half the population | Usually easy to tell. |
| Common cold on Jan. 1, 1997 | Low | Moderately low | Lots of people have colds | Uncertain about whether someone has one |

Selectivity and prior visibility are merely examples of possible attributes to define for a data item. Other attributes of a data item can also be employed within the scope of the present invention. For example, an attribute "sensitivity" can be defined for a data item to identify or quantify the level of privacy that should be associated with a particular data item. "HIV status" corresponds to information that most individuals chose to keep very confidential, and thus corresponds to high sensitivity. "State of residence" corresponds to information that is not very confidential and thus corresponds to a low sensitivity level.

These quantifiable attributes for a data item can be used to determine whether certain types of information should be available in a database. Data inclusion rules are formulated based upon established privacy or confidentiality principles, and allowable levels of the quantifiable attributes are selected to comply with those data inclusion rules.

Figure 1:
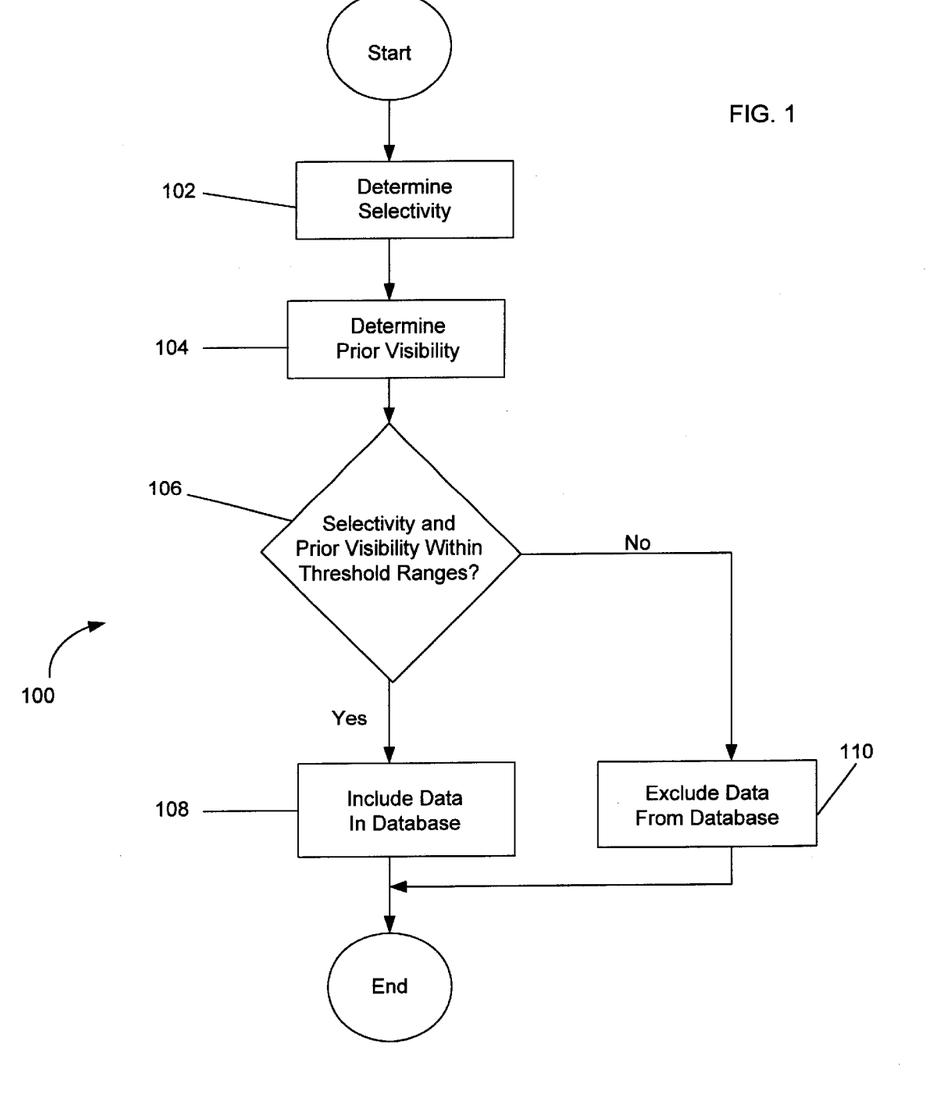
FIG. 1 depicts a flowchart of a process for evaluating a data item for inclusion into a database according to an embodiment of the invention.

FIG. 1 illustrates a flowchart of an embodiment of the invention for evaluating whether data can be stored in a database available to researchers. Consistent with this embodiment, a data inclusion rule is established to never allow highly-selective, highly-discernible data items in a database since these data items will always identify specific data subjects in a population. According to certain privacy/confidentiality principles, these types of data items cannot be safely combined with other data items because of the risk that specific data subjects will be identified with data items having high sensitivity levels. Thus, the initial actions of process 100 shown in FIG. 1 is to determine the selectivity and prior visibility of a data item (102 and 104). The data inclusion rule for process 100 includes a threshold value for selectivity and/or prior visibility values for a data item. These attribute values can be evaluated separately, together but independently, or simultaneously as a combination. At 106, a determination is made whether the selectivity/prior visibility of the data item is within threshold levels. Depending upon the privacy constraints of the system, this evaluation can be made for either or both of the selectivity and prior visibility values. If the selectivity/prior visibility values are within the threshold range, then the data item is included in the database (108). If the selectivity/prior visibility values are beyond the threshold range, then the data item is excluded from the database (108).

The quantifiable attributes for a data item can also be used to detect data queries placed against confidential information that would retrieve information violating privacy/confidentiality interests. As noted above, an individual data item that does not itself violate privacy/confidentiality interests may cause such violations if combined with other data items. Data queries can create these combinations of data items by forming "subsets" of information from a database having such confidential information. The present invention provides a mechanism that can used for systematic or automated evaluation of search queries, in which rules are established to mechanically evaluate quantified attribute values for each search query to identify possible privacy violations.

Most database query languages, such as the structured query language (SQL), have structures to allow searches in a database for specific combinations of data fields using techniques such as the intersection of sets containing the variables of interest, the union of sets containing the variables of interest, or the combination of variables. Examples of such techniques to combine data fields include database queries using boolean operations such as "AND" and "OR". When several data items are considered as a combination, their quantifiable attributes are also considered as a group. The present invention provides methods for evaluating such combinations, as illustrated below.

According to an embodiment, prior visibility of an AND combination of data items is the minimum over the prior visibility value for each data item in the combination:

$$PV(Data1 \text{ AND } Data2) = \min\{PV(Data1), PV(Data2)\} \quad \text{Equation No.1}$$

For example, consider the following query statement pseudocode:

```
SELECT  *  FROM Database
WHERE   social_security_no = "111-11-1111" AND
        hiv_disease_status = True;
```

If the prior visibility for "social_security_no" is high and prior visibility for "hiv_disease-status" is low, then the prior visibility of this AND combination is:

$$PV(\text{social\_security\_no AND hiv\_disease\_status}) = \\ \min\{PV(\text{social\_security\_no}), PV(\text{hiv\_disease\_status})\} = \\ \min\{high, low\} = low$$

It can therefore be seen that the prior visibility of an AND combination is the lowest prior visibility value for any of data items in the combination.

According to an embodiment, prior visibility of an OR combination of data items is also the minimum over the prior visibility value for each data item in the combination:

$$PV(Data1 \text{ OR } Data2) = \text{Minimum}\{PV(Data1), PV(Data2)\} \quad \text{Equation No.2}$$

For example, consider the following query statement pseudocode:

```
SELECT  *  FROM Database
WHERE   social_security_no = "111-11-1111" OR
        hiv_disease_status = True;
```

If the prior visibility for "social_security_no" is high and prior visibility for "hiv_disease-status" is low, then the prior visibility of this AND combination is:

$$PV(social\_security\_no \text{ OR } hiv\_disease\_status) = \\ Min\{PV(social\_security\_no), PV(hiv\_disease\_status)\} = \\ Min\{high, low\} = high$$

This disclosed embodiment for an OR combinations of prior visibility values utilizes the same rule as that applied for an AND combination. This embodiment takes a conservative approach towards evaluation of prior visibility to ensure a high level of privacy protection. It should be noted that other specific combining rules can also be employed within the scope of the invention for any of the combining rules expressed herein to implement various intended levels of privacy/confidentiality protection. For example, the following is a less conservative OR combining rule for prior visibility values: $PV(Data1 \text{ OR } Data2) = Average\{PV(Data1), PV(Data2)\}$ or an inversely weighted average based upon number of corresponding data subjects in each data item category.

Selectivity normally increases when several data items are considered in an AND combination. According to an embodiment, selectivity of an AND combination of data items is the product of the selectivity value for each data item in the combination if selectivity is quantified as the proportion or proportion of data subjects in a given population group corresponding to a selected data item:

$$Select(Data1 \text{ AND } Data2) = Select(Data1) * Select(Data2) \quad \text{Equation No.3}$$

For example, consider the following query statement pseudocode:

```
SELECT  *  FROM Database
WHERE   Black_Hair_Color = True AND
        hiv_disease status = True;
```

If forty percent of the universe of data subjects has black hair, i.e., the selectivity for "Back_Hair_Color" is (0.4) and one percent of the universe of data subjects has HIV, i.e., the selectivity of "hiv_disease-status" is (0.01), then the selectivity of this AND combination is:

$$Select(social\_security\_no \text{ AND } hiv\_disease\_status) = Select(social\_security\_no) * Select(hiv\_disease\_status)\} = (0.4)*(0.01) = 0.004$$

Therefore, selectivity of this AND combination significantly increases over the selectivity of each of the data items taken individually.

Selectivity normally decreases when several data items are considered in an OR combination. This is because in an OR combination, all sets of data subjects corresponding to the OR query terms satisfy the search query. According to an embodiment, selectivity of an OR combination of data items is the addition of the selectivity value for each data item in the combination if selectivity is quantified as the percentage or proportion of data subjects in a given population group corresponding to a selected data item:

$$Select(Data1 \text{ OR } Data2) = Minimum\{1, (Select(Data1) + Select(Data2))\} \quad \text{Equation No.4}$$

For example, consider the following query statement pseudocode:

```
SELECT  *  FROM Database
WHERE   Black_Hair_Color = True OR
        hiv_disease_status = True;
```

If the selectivity for "Back_Hair_Color" is (0.4) and the selectivity of "hiv_disease-status" is (0.01), then the selectivity of this AND combination is:

$$Select(social\_security\_no \text{ OR } hiv\_disease\_status) = Min\{1, Select(social\_security\_no) + Select(hiv\_disease\_status)\} = \\ Min\{1, (0.4+0.01)\} = Min\{1, 0.41\} = 0.41$$

The selectivity of a combination may also be evaluated by a dynamic query of actual data, e.g., by counting actual records from a database in response to query execution. Selectivity may also be determined by static analysis of a database. For example, the proportion of data subjects having a particular "zip code" could be calculated ahead of time to more accurately determine selectivity of queries searching for particular zip code values. Alternatively, heuristics may also be employed to determine selectivity.

More complicated query structures or languages may require additional analysis to determine the selectivity and prior visibility of the query from the selectivity and prior visibility assigned to data items in the database. Such an analysis might include translating or decomposing the expressed query into a simpler or related form, extensions of the boolean algebra for selectivity and prior visibility indicated above, or actual computation of record counts for related queries. In addition, other approaches for determining attribute values for combinations of attributes can be employed within the scope of the invention, particularly for attributes not defined exactly as noted in the above example.

These types of combining rules or equations to evaluate attribute values for combinations of data items can be mechanically applied in an automated query evaluation system to systematically identify data queries that could violate privacy/confidentiality interests. Consistent with an embodiment, the selectivity and prior visibility ratings for the data query are evaluated with respect to a set of privacy/confidentiality rules. These rules establish threshold levels of selectivity and/or prior visibility values permitted for a valid data query. The choice of the threshold value embodies the privacy/confidentiality policy in force. The privacy/confidentiality rules can be expressed in a variety of ways, such as mathematical functions of the selectivity and visibility ratings, tables or even graphically for manual systems. These attributes may be evaluated separately or in combination. Note that other types of attributes (e.g., sensitivity) may also be utilized for analysis of search queries. Depending upon the type of privacy rule that is implemented, exact selectivity and prior visibility (or other attribute) values may not be needed, with approximate values sufficient to determine potential privacy violations.

The following is an example privacy/confidentiality rule for analyzing whether a data query should be permitted:

Do not allow queries involving low-prior visibility subsets of high-selectivity, high-prior visibility sets.

As noted above, a data query against a database of confidential information can be modeled as producing a subset of the population represented in that database. Data queries are examined to determine whether the subset of information responsive to the query terms have selectivity and prior visibility values that would violate this rule. If so, then the query is rejected.

Consider the query "male AND zip code 20500 AND date-of-birth August, 1946 AND SSRI prescription during 1997". The prior visibility of "male", "zip code", and "date-of-birth" are quite high since these types of information are relatively easy to obtain. The prior visibility of "SSRI prescription during 1997" is quite low since ordinary observers could not easily determine this information for most individuals. Since this is an AND combination, the prior visibility of the combination equates to the minimum prior visibility of the individual data items in the set (Equation No. 1). Thus, the combination (subset)has low prior visibility. The data item "zip code 20500" is very selective since it is the zip code for the White House in Washington, D.C. which has very few data subjects. The other data items "male", "date of birth August 1946", and "SSRI prescription during 1997" are not highly selective since they correspond to a very large set of data subjects. Therefore, this query violates the above privacy rule since it seeks a low prior visibility subset of the entire set of highly desirable, highly selective information. On the other hand, the superset query without the SSRI term, i.e. "male AND zip code 20500 AND date-of-birth August, 1946", is highly-selective and highly-discernible; therefore, it not violate the example privacy rule. In general, the analysis of superset queries may use any of the methods and data applied to the analysis of the input query.

Figure 2:
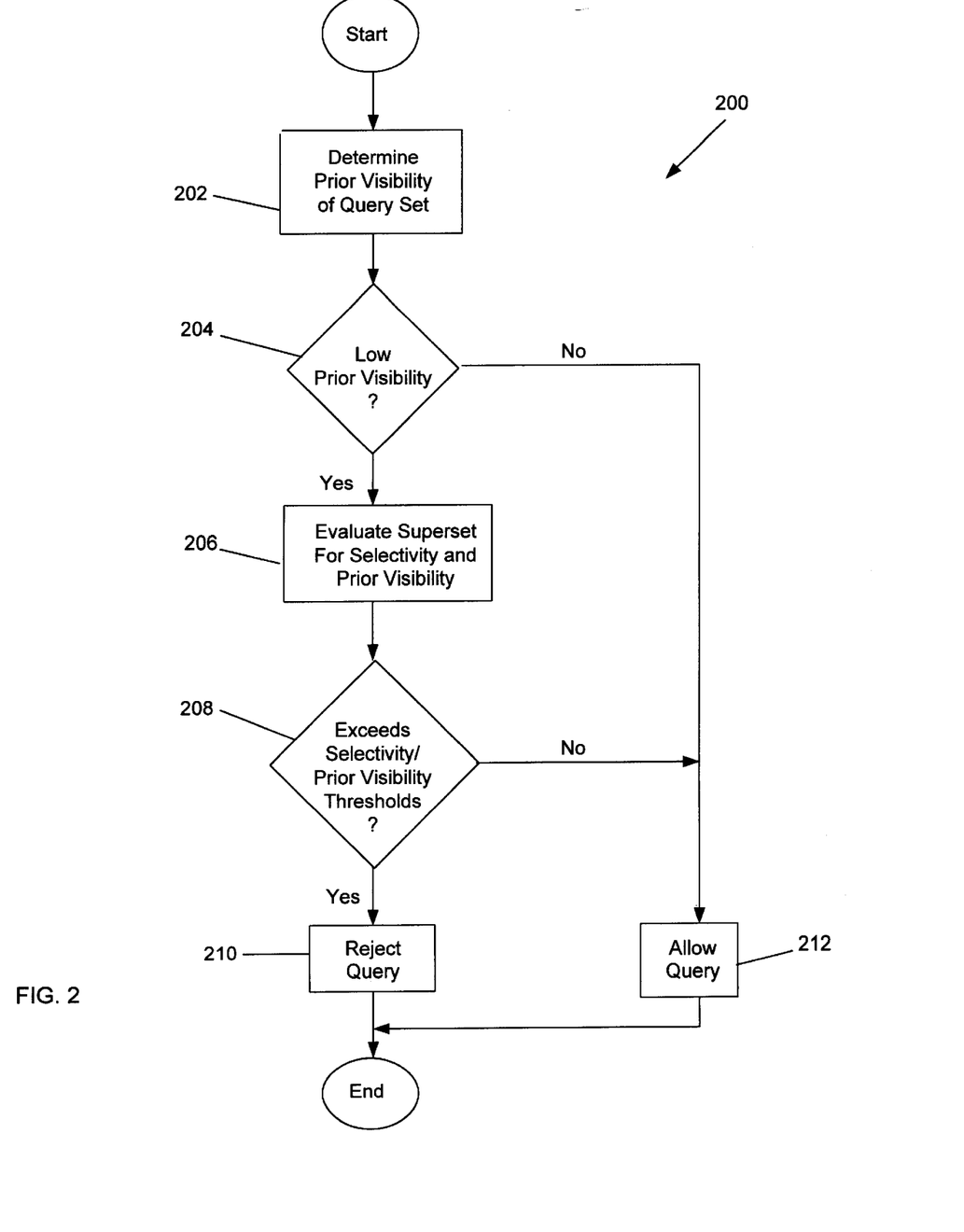
FIG. 2 depicts a flowchart of a process for evaluating a data query.

FIG. 2 depicts a flowchart of a process 200 to implement this rule. Initially, an identification is made of the selectivity threshold for the query and each individual data item should be associated with a prior visibility value. The candidate sets responsive to the query are evaluated for prior visibility using the combining equations set forth above (202). If the candidate sets have low prior visibility (204), then their supersets are evaluated for selectivity and prior visibility (206). If any of the supersets are below the selectivity threshold and exceeds the prior visibility threshold (208), then the query is rejected (210). Otherwise, the query complies with the established privacy rule and is permitted to execute (212).

The query analysis can be performed either with or without a check of the actual results to be returned to the query. A query that fails an established privacy/confidentiality rule could be discarded without actually executing the query. Alternatively, the query could be executed despite the initial query analysis that indicates noncompliance with a privacy rule, but the actual results are analyzed to determine whether the set of responsive records is such that it maintains an appropriate level of privacy/confidentiality (e.g., a very large number of records are returned with no fields having direct identification of a data subject). Even for data queries that comply with the privacy rules, it may be desirable to examine the actual results to determine whether the returned set of records to the query actually satisfies the established privacy/confidentiality policies.

An aspect of an embodiment is that the status of the individual initiating the query can be used in the determination of whether the query complies with privacy/confidentiality rules. For example, a researcher having a high security clearance may be allowed greater access to information than a researcher with a low security clearance. The following sets forth an example of second set of privacy rules in tabular format that takes the status of the researcher into consideration along with the selectivity and prior visibility of the data combination being queried:

TABLE 2

| Researcher Clearance Level | Selectivity High Prior visibility High | Selectivity High Prior visibility Low | Selectivity Low Prior visibility High | Selectivity Low Prior visibility Low |
|---|---|---|---|---|
| High | Allow Access | Allow Access | Allow Access | Allow Access |
| Medium | Allow Access | No Access | Allow Access | Allow Access |
| Low | Allow Access | No Access | Allow Access | No Access |

For the example shown in Table 2, the researcher clearance level is shown in the left-most column. The upper row contains selectivity/prior visibility combinations. The middle grid indicates the validity of queries having various combinations of researcher status and selectivity/prior visibility.

Privacy rules such as that shown in Table 2 may also incorporate additional levels of attribute evaluation. For example, it was noted above that prior visibility values are determined with respect to a particular class of observers, since a data item may be more visible to certain class of observers (e.g., primary care physician) than with other classes of observers (e.g., casual observer without specialized access to a data subject). Thus, different classes of observers may correspond to different prior visibility ratings for the same data item. The privacy rule of Table 2 could be expanded to also consider different levels of prior visibility ratings based upon different types of intended observers/researchers.

SYSTEM ARCHITECTURE OVERVIEW

Figure 3:
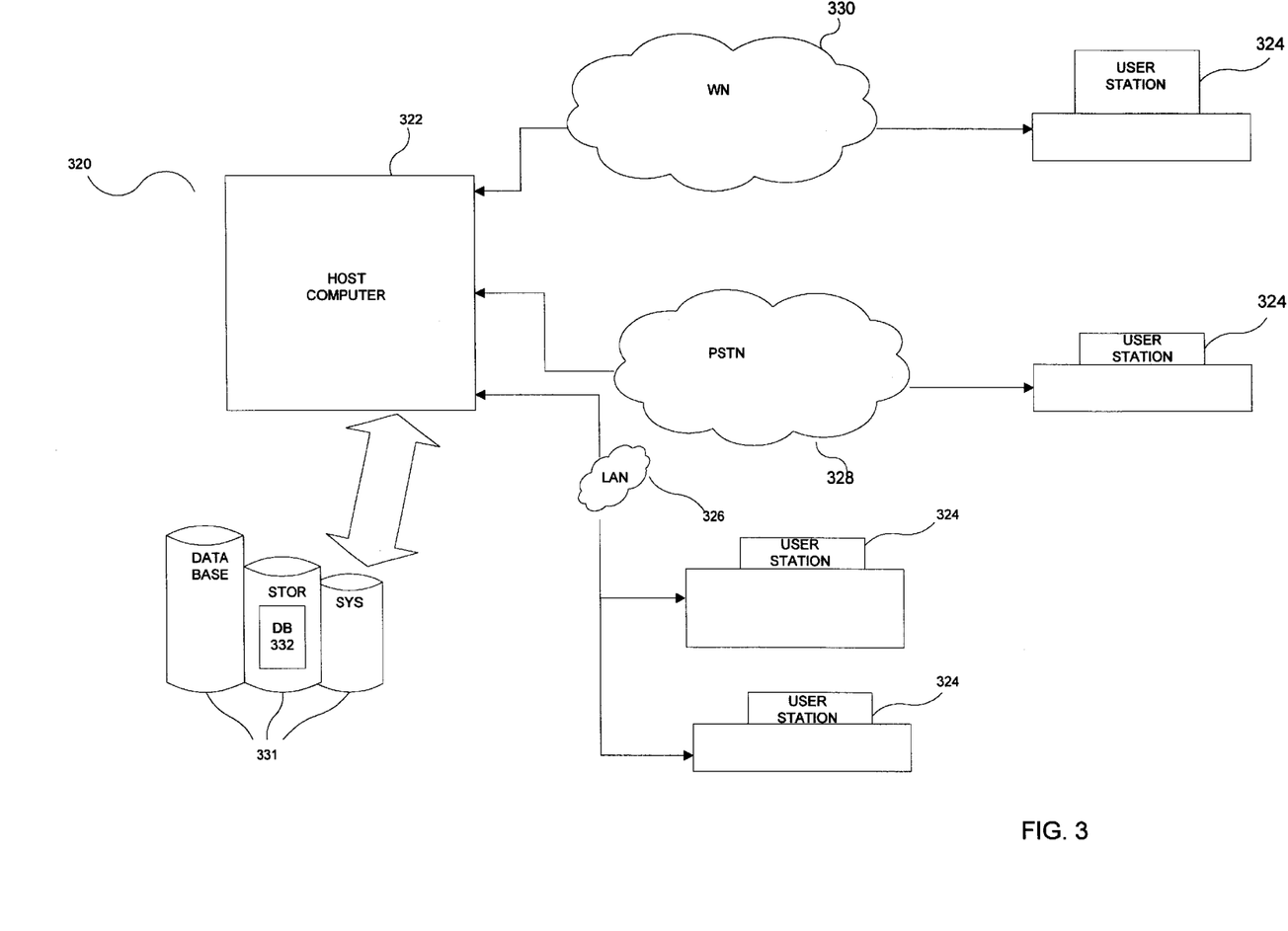
FIGS. 3–4 depict computer architecture configuration(s) upon which the present invention may be implemented.

Referring to FIG. 3, in an embodiment, a computer system 320 includes a host computer 322 connected to a plurality of individual user stations 324. The user stations 324 each comprise suitable data interface terminals, for example, but not limited to, personal computers, portable laptop computers, or personal data assistants ("PDAs"), which can store and independently run one or more applications. For purposes of illustration, some of the user stations 324 are connected to the host computer 322 via a local area network ("LAN") 326. Other user stations 324 are remotely connected to the host computer 322, e.g., via a public telephone switched network ("PSTN") 328 and/or a wireless network ("WN") 330.

In an embodiment, the host computer 322 operates in conjunction with a data storage system 331, wherein the data storage system 331 contains a database 332 that is readily accessible by the host computer 322. Note that a multiple tier architecture can be employed to connect user stations 324 to a database 332, utilizing for example, a middle application tier (not shown). In alternative embodiments, the database 332 may be resident on the host computer, stored, e.g., in the host computer's ROM, PROM, EPROM, or any other memory chip, and/or its hard disk.

Figure 4:
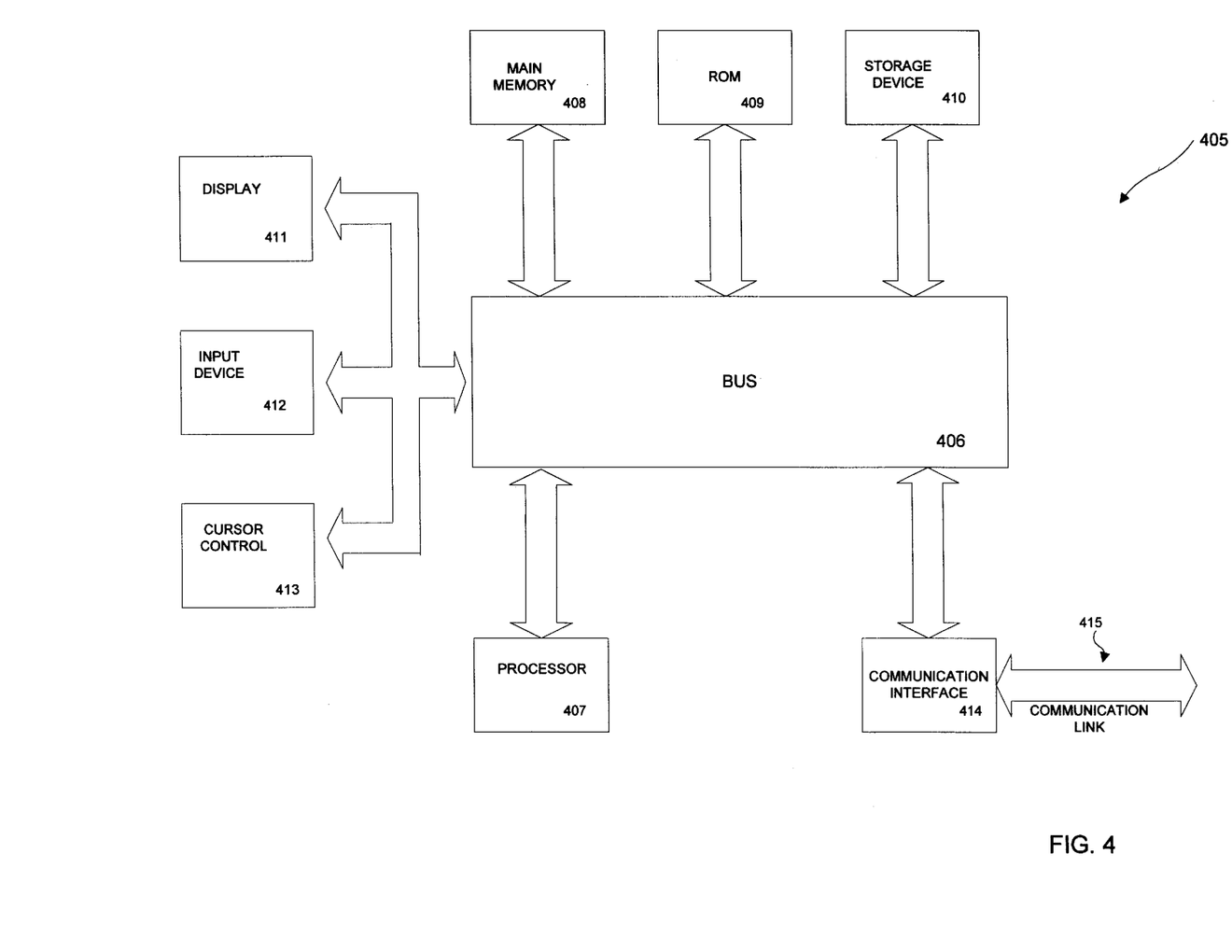

Referring to FIG. 4, in an embodiment, each user station 324 and the host computer 322, each referred to generally as a processing unit, embodies a general architecture 405. A processing unit includes a bus 406 or other communication mechanism for communicating instructions, messages and data, collectively, information, and one or more processors 407 coupled with the bus 406 for processing information. A processing unit also includes a main memory 408, such as a random access memory (RAM) or other dynamic storage device, coupled to the bus 406 for storing dynamic data and instructions to be executed by the processor(s) 407. The main memory 408 also may be used for storing temporary data, i.e., variables, or other intermediate information during execution of instructions by the processor(s) 407. A processing unit may further include a read only memory (ROM) 409 or other static storage device coupled to the bus 406 for storing static data and instructions for the processor(s) 407. A storage device 410, such as a magnetic disk or optical disk, may also be provided and coupled to the bus 406 for storing data and instructions for the processor(s) 407. A processing unit may be coupled to a display device 411 for displaying information to a user. An input device 412 is coupled to the bus 406 for communicating information and command selections to the processor(s) 407. User input device 412 may include a cursor control 413 for communicating direction information and command selections to the processor(s) 407 and for controlling cursor movement on the display 411.

According to one embodiment of the invention, the individual processing units perform specific operations by their respective processor(s) 407 executing one or more sequences of one or more instructions contained in the main memory 408. Such instructions may be read into the main memory 408 from another computer-usable medium, such as the ROM 409 or the storage device 410. Execution of the sequences of instructions contained in the main memory 408 causes the processor(s) 407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 407. Such a medium may take many forms, including, but not limited to, non-volatile, volatile and transmission media. Non-volatile media, i.e., media that can retain information in the absence of power, includes the ROM 409. Volatile media, i.e., media that can not retain information in the absence of power, includes the main memory 408. Transmission media includes coaxial cables, copper wire and fiber optics, including the wires that comprise the bus 406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Various forms of computer-usable media may be involved in providing one or more sequences of one or more instructions to the processor(s) 407 for execution.

Each processing unit may also include a communication interface 414 coupled to the bus 406. The communication interface 414 provides two-way communication between the respective user stations 424 and the host computer 422. The communication interface 414 of a respective processing unit transmits and receives electrical, electromagnetic or optical signals that include data streams representing various types of information, including instructions, messages and data. A processing unit may transmit and receive messages, data, and instructions, including program, i.e., application, code, through its respective communication link 415 and communication interface 414. Received program code may be executed by the respective processor(s) 407 as it is received, and/or stored in the storage device 410, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein are merely illustrative, and the invention can be performed using different or additional process actions, or a different combination or ordering of process actions. The specification and drawings are, accordingly, to be regarded in an illustrative rather than restrictive sense.

I claim:

1. A method of evaluating attributes of a data item pertaining to privacy interests of a data subject associated with the data item, comprising:

receiving data associated with a data subject, the data comprising at least one data item;

identifying two or more attributes for the data item, the two or more attributes indicative of likelihood of identification of the data subject based upon access to the data item, a second one of the two or more attributes relating to a measure of visibility that an observer has about the data item for data subjects; and quantifying each of the two or more attributes for the data item with corresponding attribute values.

2. The method of claim 1 in which the second one of the two or more attributes comprises prior visibility.

3. The method of claim 2 in which prior visibility is determined with respect to an ordinary observer without specialized access or knowledge of the data subject.

4. The method of claim 2 in which the act of quantifying the two or more attributes comprises:

determining a category of prior visibility for the two or more attributes.

5. The method of claim 2 in which the act of quantifying the two or more attributes comprises:

assigning an attribute value along a scale of values.

6. A method of evaluating attributes of a data item pertaining to privacy interests of a data subject associated with the data item, comprising:

receiving data associated with a data subject, the data comprising at least one data item;

identifying two or more attributes for the data item, the two or more attributes indicative of likelihood of identification of the data subject based upon access to the data item;

quantifying each of the two or more attributes for the data item with corresponding attribute values; and determining whether to store the data item in a database available to researchers based upon the attribute values by, establishing a threshold prior visibility level; and rejecting inclusion of the data item in the database if the attribute values for prior visibility exceeds the threshold prior visibility level.

7. A method of evaluating attributes of a data item pertaining to privacy interests of a data subject associated with the data item, comprising:

receiving data associated with a data subject, the data comprising at least one data item;

identifying two or more attributes for the data item, the two or more attributes indicative of likelihood of identification of the data subject based upon access to the data item, the two or more attributes comprising sensitivity that identifies a level of privacy associated with the data item; and quantifying each of the two or more attributes for the data item with corresponding attribute values.

8. A method for evaluating a data query seeking to access data associated with a data subject, comprising:

receiving a data query seeking to access data associated with one or more data subjects, the data comprising one or more data items;

identifying a combination of the one or more data items sought by the data query; and quantifying one or more attribute values for the combination of one or more data items sought by the data query, the one or more attribute values indicative of likelihood of identification of a specific data subject associated with the combination of the one or more data items, the one or more attribute values relating to a measure of visibility that an observer has about the data items.

9. The method of claim 8 in which the one or more attribute values comprises prior visibility.

10. The method of claim 9 in which the act of quantifying an AND combination for prior visibility comprises:

determining a minimum of prior visibility values for the combination of the data items.

11. The method of claim 9 in which the act of quantifying an OR combination for prior visibility comprises:

determining a maximum of prior visibility values for the combination of the data items.

12. The method of claim 9 in which the one or more attribute values comprises selectivity.

13. The method of claim 12 in which a privacy rule for evaluating the data query comprises:

rejecting the data query if it involves a low-prior visibility subset of high-selectivity high-prior visibility sets.

* * * * *